United States Patent
Lutz

(10) Patent No.: US 8,516,894 B2
(45) Date of Patent: Aug. 27, 2013

(54) ELECTRONIC CIRCUIT FOR CONTROLLING A CAPACITIVE PRESSURE SENSOR AND CAPACITIVE PRESSURE SENSOR SYSTEM

(75) Inventor: Josef Lutz, Rohrau (AT)

(73) Assignee: NXP B.V., Eindhoven (NL)

( * ) Notice: Subject to any disclaimer, the term of this patent is extended or adjusted under 35 U.S.C. 154(b) by 392 days.

(21) Appl. No.: 12/988,979

(22) PCT Filed: Apr. 3, 2009

(86) PCT No.: PCT/IB2009/051405
§ 371 (c)(1),
(2), (4) Date: Oct. 21, 2010

(87) PCT Pub. No.: WO2009/130626
PCT Pub. Date: Oct. 29, 2009

(65) Prior Publication Data
US 2011/0056302 A1    Mar. 10, 2011

(30) Foreign Application Priority Data
Apr. 23, 2008 (EP) .................................. 08103678

(51) Int. Cl.
*G01L 9/12* (2006.01)
(52) U.S. Cl.
USPC ............................. 73/724; 73/715; 361/283.4
(58) Field of Classification Search
None
See application file for complete search history.

(56) References Cited

U.S. PATENT DOCUMENTS

| | | | | |
|---|---|---|---|---|
| 5,786,991 A * | 7/1998 | Koszarsky | ....................... | 363/84 |
| 6,119,523 A * | 9/2000 | Olsson et al. | .................... | 73/718 |
| 6,151,967 A * | 11/2000 | McIntosh et al. | ........... | 73/514.32 |
| 6,456,477 B1 * | 9/2002 | McIntosh et al. | ............. | 361/115 |
| 6,507,187 B1 * | 1/2003 | Olivas et al. | ............. | 324/207.21 |
| 6,586,943 B1 * | 7/2003 | Masuda et al. | ................ | 324/500 |
| 6,828,801 B1 * | 12/2004 | Burdick et al. | ............... | 324/658 |
| 2006/0230835 A1 | 10/2006 | Wang | | |

FOREIGN PATENT DOCUMENTS

JP    11-258092 A    9/1999

OTHER PUBLICATIONS

International Search Report and Written Opinion for int'l. patent appln. No. PCT/IB2009/051405 (Jul. 6, 2009).

* cited by examiner

*Primary Examiner* — Lisa Caputo
*Assistant Examiner* — Jermaine Jenkins

(57) ABSTRACT

An electronic circuit (10) for controlling a capacitive pressure sensor (1), which capacitive pressure sensor (1) comprises a plate electrode capacitor (C) with a capacity that varies in dependence on pressure changes exerted on a deflectable diaphragm (2) forming one plate electrode of the capacitor (C), wherein the electronic circuit (10) comprises a DC voltage source (12) being adapted to generate a DC bias-voltage (UDC) to be applied across the electrodes of the capacitor (C), an AC voltage source (13) being adapted to generate an AC voltage signal (UAC) to be applied across the electrodes of the capacitor (C) and a controller (18) being adapted to receive an output signal (OUT) of the capacitor (C) and to control the DC voltage source (12) such that the DC bias-voltage (UDC) applied to the capacitor (C) adopts a value that maintains the capacity of the capacitor (C) at a desired value.

15 Claims, 1 Drawing Sheet

ELECTRONIC CIRCUIT FOR CONTROLLING A CAPACITIVE PRESSURE SENSOR AND CAPACITIVE PRESSURE SENSOR SYSTEM

FIELD OF THE INVENTION

The invention relates to an electronic circuit for controlling a capacitive pressure sensor. The invention further relates to a capacitive pressure sensor system.

BACKGROUND OF THE INVENTION

A capacitive pressure sensor, particularly a capacitive microphone, configured as a pressure difference sensor, generally comprises a very thin metallized diaphragm that forms one plate electrode of a capacitor and a back plate forming a second plate electrode of the capacitor. The diaphragm is tightly stretched to have a high resonant frequency, and is placed at a distance very close to the back plate. The diaphragm is deflected by a pressure difference between its front surface and its back surface, wherein the back surface of the diaphragm together with a housing of the pressure sensor encircles a back volume and seal it against the environment. Deflecting the diaphragm causes slight changes of the capacitance of the capacitor. The back volume constitutes a reference pressure which is decisive for the function of each capacitive pressure sensor. Large back volumes are required for achieving high sensitivities of capacitive pressure sensors, since large back volumes enable larger deflections of the diaphragm in reaction to pressure differences between its front surface and its back surface. However, large back volumes are very disadvantageous for micro-electro-mechanical-system (MEMS) based sensors, since they dramatically limit potential miniaturization and cause higher production costs.

One approach to overcome the requirement of large back volumes for high-sensitive capacitive pressure sensors is to evacuate the back volume. Then the back volume has to be just as large as the volume between the diaphragm and the back plate. See e.g. US 2006/0230835. The disadvantage of this method is that the diaphragm has to biased with the environmental pressure being about five orders of magnitudes higher than the average sound pressure for microphones. US 2006/0230835 suggests to circumvent this disadvantage by applying a high bias-voltage across the diaphragm and the back plate which bias-voltage urges the diaphragm against the return force exerted by the pressure difference into an optimum distance from the back plate. Nevertheless, with this concept, the diaphragm is always in a critical state, since even smallest variations of the bias-voltage and/or the environmental pressure, respectively, cause the diaphragm to collapse against the back plate. This collapse inevitably occurs when the diaphragm is deflected to a position where electrostatic force overcomes the mechanical restoring force of the diaphragm. The reason for this behaviour is the reciprocal relation of the electrostatic force and the distance between the diaphragm and its back plate, i.e. that the electrostatic force increases with a decreasing distance between diaphragm and back plate. Hence, if the actual distance between the diaphragm and its back plate falls below a critical distance which depends on the mechanical dimensions and the bias-voltage then the diaphragm cannot maintain a stable location and collapses against the back plate. Particularly for capacitive microphones the pressure differences caused by sound waves to be measured by the microphone are considerably smaller than variations in the environmental pressure caused by weather changes or varying altitudes. Therefore, for capacitive microphones the actual bias voltage has to be set far away from an ideal operating point that would be reached when the diaphragm is held quite close to the critical distance to its back plate. The result of these necessary engineering compromises are microphones with reduced sensitivities.

OBJECT AND SUMMARY OF THE INVENTION

It is an object of the invention to provide an electronic circuit of the type defined in the opening paragraph and a capacitive pressure sensor system of the type defined in the second paragraph, in which the disadvantages defined above are avoided.

In order to achieve the object defined above, with an electronic circuit according to the invention characteristic features are provided that can be characterized in the way defined below, that is:

An electronic circuit for controlling a capacitive pressure sensor, which capacitive pressure sensor comprises a plate electrode capacitor with a capacity that varies in dependence on pressure changes exerted on a deflectable diaphragm forming one plate electrode of the capacitor, wherein the electronic circuit comprises a DC voltage source being adapted to generate a DC bias-voltage to be applied across the electrodes of the capacitor, an AC voltage source being adapted to generate an AC voltage signal to be applied across the electrodes of the capacitor and a controller being adapted to receive an output signal of the capacitor and to control the DC voltage source such that the DC bias-voltage applied to the capacitor adopts a value that maintains the capacity of the capacitor at a desired value.

In order to achieve the object defined above, with a capacitive pressure sensor system according to the invention characteristic features are provided that can be characterized in the way defined below, that is:

A capacitive pressure sensor system, comprising the above cited electronic circuit and a capacitive pressure sensor, particularly a capacitive microphone, that comprises an electrically conductive diaphragm being deflectable by a varying pressure, particularly a sound pressure, and an electrically conductive back plate, wherein the diaphragm and the back plate are spaced from each other and form a first and a second plate electrode of a capacitor, wherein the DC bias-voltage and the AC voltage signal are applicable across the diaphragm and the back plate.

The core idea of the present invention is to adapt the operational point of the capacitive pressure sensor to the slowly varying environmental pressure. This means that the bias-voltage of the slowly varying capacity formed by the diaphragm and the back plate is controlled in such a way that the average capacity and thereby the distance between the diaphragm and the back plate is kept constant.

The characteristic features according to the invention provide the advantage that a capacitive pressure sensor with increased sensitivity and higher robustness to environmental pressure variations is achieved. Non-linearities of the capacitive pressure sensor system are reduced and an automatic compensation of manufacturing tolerances is achieved. The invention is particularly suitable for capacitive MEMS sensors, especially for MEMS based capacitive microphones. Generally, the present invention stabilizes the functions of capacitive pressure sensors and protects against collapsing of the diaphragm of such a capacitive pressure sensor.

It should be mentioned that document U.S. Pat. No. 6,151,967 describes a capacitive transducer with wide dynamic range. This transducer comprises a variable area capacitor with a flexible electrode responsive to a physical effect and a rigid electrode with a predetermined surface contour. The surface contour is dimensioned to provide a specific change in capacitance with deflection of the flexible electrode. A thin dielectric layer maintains a substantially fixed spacing between the two electrodes. Preferred embodiments of this known capacitive transducer include a pressure sensor, microphone and accelerometer. A differential transconductance amplifier detects changes of the variable capacitor in a low-impedance, bridge-like circuit and feeds back current to balance the bridge. The voltage that controls the feedback current is proportional to capacitance over a wide dynamic range. It is further mentioned in this document that capacitive transducers used to measure acceleration frequently use electrostatic force-feedback to maintain a suspended proof mass in a substantially fixed location. This minimizes non-linear capacitance sensitivity with electrode spacing. However, the author of U.S. Pat. No. 6,151,967 also mentions that feedback cannot increase capacitance sensitivity or overcome the disadvantages of small quiescent capacitance limited by practical electrode spacing.

The present invention differs from the disclosure of U.S. Pat. No. 6,151,967 in that it aims at keeping the diaphragm of the capacitive pressure sensor, particularly of a capacitive microphone, in an optimal distance to the backplate, resulting in maintaining the capacity of the capacitor formed by the diaphragm and the backplate at a desired value. This results in an ideal sensitivity of the capacitive pressure sensor. Potential variations of the mutual distance between diaphragm and back plate are compensated for. This is achieved in that the compensational movement of the diaphragm caused by the DC bias-voltage controlled according to the invention operates very slowly, and particularly with change rates below the operational frequency range of the capacitive pressure sensor. These slow change rates are ideal for compensating slowly occurring variations in the environmental conditions, such as changes of the atmospheric pressure due to weather or temperature changes, or changes in the altitude of the position of the capacitive pressure sensor. This is a fundamental difference to the subject matter of U.S. Pat. No. 6,151,967 which uses the feedback-signal that changes a bias-voltage for determining the quantity to be measured, which is why the change rates in the feedback-signal and the bias-voltage must be within the operational frequency range of the described transducer. In contrast to the suggestions of U.S. Pat. No. 6,151,967 the present invention does not (and cannot) use the feedback signal for determining the quantity to be measured. Rather, according to the present invention measuring of the capacitance of the capacitor is accomplished by superimposing an additional AC voltage signal to the DC bias-voltage and measuring the capacitive reactance (or its variations) resulting from applying said additional AC voltage signal. The measured changes of the capacitance of the capacitor is used for controlling the DC bias-voltage. This means that according to the present invention it is not a goal to keep a mass of the sensor in a constant position and to use the control signal as a representation of the quantity to be measured, but to measure the capacity only for setting the bias-voltage such that the mean position of the diaphragm results in an ideal and high sensitivity. According to the invention it is desired that the diaphragm can move around this mean position as much as possible.

In order to avoid interferences with the output signals of the capacitive pressure sensor it is preferred to set the frequency of the AC voltage signal outside the operational frequency range of the capacitive pressure sensor. For many applications it is convenient to design the capacitive pressure sensor with an operational frequency range having a lower limit at 100 Hz and an upper limit at 20 kHz. When the operational frequency range of the capacitive pressure sensor has the afore mentioned upper limit at 20 kHz, then the frequency of the AC voltage signal is preferably set to be above 100 kHz.

For even better suppression of interferences the frequency of the AC voltage signal is set above an intrinsic resonance frequency of the diaphragm of the capacitor. Preferably, the frequency of the AC voltage signal is set to be between five times and twenty times higher than the intrinsic resonance frequency of the diaphragm of the capacitor.

In another embodiment of the invention interferences between the output signal of the capacitive pressure sensor and the AC voltage signal are avoided by setting the amplitude of the AC voltage signal so low that it does not interfere with the output signal of the capacitive pressure sensor.

In another important aspect of the invention the controller is adapted to change the value of the DC bias-voltage signal with a change rate below the lower limit of the operational frequency range of the capacitive pressure sensor. Thereby, the capacity of the capacitive pressure sensor is controlled in accordance with slow environmental pressure changes caused by weather changes or the like.

By arranging a band pass filter between the capacitor and the controller signal components except the AC voltage signal are cut of from the signal that is fed to the controller. Preferably, after this filtering step the signal is rectified in a rectifier which is arranged between the capacitor and the controller.

By arranging a low pass filter is arranged between the capacitor and the controller any existing high-frequency noise signals are removed from the signal that is fed to the controller.

In order to achieve high sensitivity it is suggested to provide a back volume which is defined by the diaphragm and a housing. According to one embodiment of the invention this back volume is evacuated. In order to provide a large back volume the back plate has a plurality of through holes and the back volume continuously extends to both sides of the back plate.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 1:
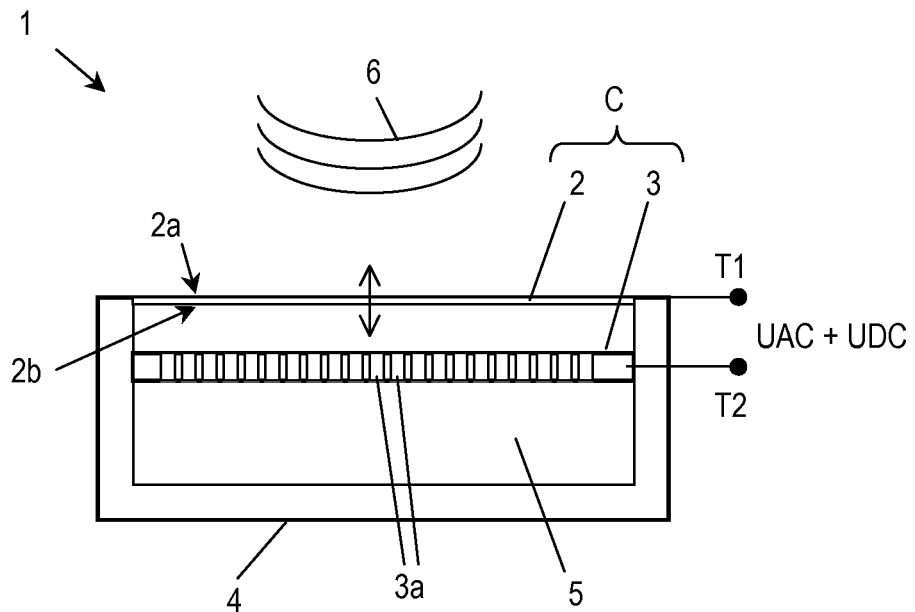
FIG. 1 shows a schematic cross section of a capacitive pressure sensor.

A capacitive pressure sensor 1, configured as a capacitive microphone, will be explained now with reference to the cross sectional representation of FIG. 1. The capacitive pressure sensor 1 generally comprises a very thin metallized diaphragm 2 that forms one plate electrode of a capacitor. An electrically conductive back plate 3 arranged in parallel to the diaphragm 2 forms a second plate electrode of the capacitor. The diaphragm 2 and the back plate 3 are connectable by means of terminals T1, T2 to an electronic circuit 10 (see FIG. 2) for controlling the capacitive pressure sensor 1, which circuit will be explained in detail later. Through the terminals T1, T2 the circuit 10 applies a DC bias-voltage UDC and an AC voltage signal UAC across the diaphragm 2 and the back plate 3. The diaphragm 2 is tightly stretched to have a resonant frequency that is considerably above the operating frequency range of the capacitive pressure sensor 1, e.g. at above 50 kHz, and is placed at a distance very close to the back plate 3 allowing it to be deflected by sound waves 6, strictly speaking by a pressure difference that occurs between its front surface 2a and its back surface 2b when the sound waves 6 impinge on the front surface 2a. The diaphragm 2 encircles together with a housing 4 a back volume 5 and seal it against the environment. It should be noted that the back plate 3 is arranged within the back volume 5 and has a plurality of through holes 3a, such that the effective back volume 5 extends to both sides of the back plate 3. Deflecting the diaphragm 2 causes slight changes of the capacitance of the capacitor C due to the variation of the mutual distance between the diaphragm 2 and the back plate 3. The back volume 5 constitutes a reference pressure which is decisive for the function of the capacitive pressure sensor 1. The capacitive pressure sensor 1 may be designed as a micro-electro-mechanical-system (MEMS).

The core idea of the present invention is to adapt the operational point of the capacitive pressure sensor 1 to the slowly varying environmental pressure. This means that the bias-voltage UDC is adapted in dependence of changes of the environmental pressure such that the average capacity of the capacitor C formed by the diaphragm 2 and the back plate 3 and thereby the mutual distance between the diaphragm 2 and the back plate 3 is kept constant.

In order to measure the capacity of the capacitor C which will be used as a control parameter the inventions suggests to superimpose an AC voltage signal UAC across the diaphragm 2 and the back plate 3 to the DC bias-voltage UDC. The frequency f of the AC voltage signal UAC is selected to be outside the operational frequency range of the capacitive pressure sensor 1 and/or the amplitude of the AC voltage signal UAC is set so small that it does not interfere with the output signal of the capacitive pressure sensor 1. Preferably, the frequency of the AC voltage signal UAC is set to be above the intrinsic resonance frequency of the diaphragm 2, e.g. to a value being about one order of magnitude above the intrinsic resonance frequency of the diaphragm. Such a high frequency of the AC voltage signal UAC results in only very small deflections of the diaphragm 2 which do not interfere with the deflections caused by sound waves 6.

Figure 2:
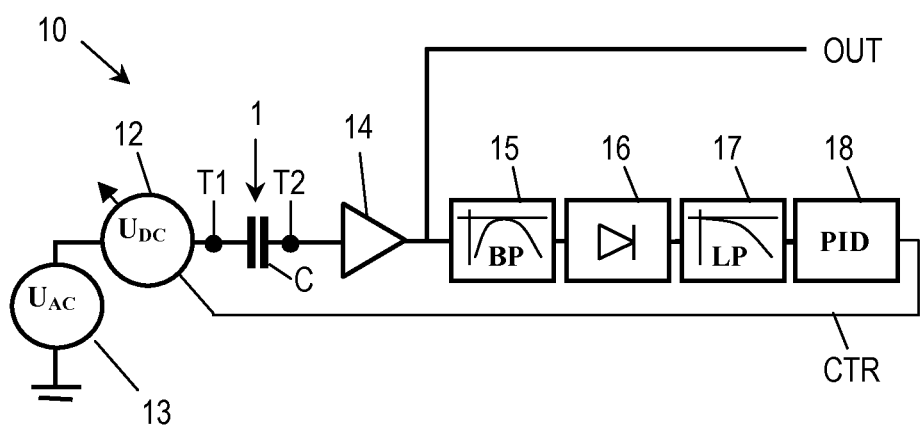
FIG. 2 shows a block circuit diagram of an electronic circuit for controlling a capacitive pressure sensor.

The AC voltage signal is used to measure the (average) capacity of the capacitive pressure sensor which capacity is used as a feed-back signal for controlling the DC bias-voltage UDC. FIG. 2 shows an embodiment of a circuit 10 for controlling of the capacitive pressure sensor 1. The capacitive pressure sensor 1 is represented in the diagram of FIG. 2 by its equivalent electric capacitor symbol C. The capacitive pressure sensor 1 is serially switched by means of terminals T1, T2 between a DC voltage source 12 generating the DC bias-voltage UDC and an amplifier 14. Further, an AC voltage source 13 generating the AC voltage UAC(f) with a predefined frequency f is serially connected to the DC voltage source 12. Therefore the voltage signal fed to the capacitive pressure sensor 1 is a combined AC- and DC voltage signal. The output signal OUT of the amplifier 14 represents the output signal of the capacitive pressure sensor 1 and also constitutes a measure signal that is characteristic for the capacity of the capacitive pressure sensor 1. The output signal OUT is fed to a band pass filter 15 having a center frequency that corresponds to the frequency f of the AC voltage signal UAC for cutting off both the DC voltage UDC and any high-frequency noise. Thereby, only the AC voltage signal UAC passes the band pass filter 15 which is subsequently rectified in a rectifier 16. The rectified signal is fed to a low pass filter 17 so that only slow variations of the rectified signal can pass which are subsequently fed as an input signal to a controller 18 configured as a PID controller. The output signal CTR of the controller 18 controls the DC voltage source 12 such that the DC bias-voltage UDC applied to the capacitive pressure sensor 1 adopts a value that maintains the measured capacity of the capacitive pressure sensor 1 constant.

As will be recognized, the present invention provides a classical feed-back control circuit to hold the capacity of capacitor C constant, wherein the system under control is defined by the DC voltage source 12, the capacity of the capacitive pressure sensor 1 and the amplifier 14, and the controller system comprises the signal processing components, i.e. band pass filter 15, rectifier 16, low pass filter 17, and the PID controller 18. Due to this feed-back control it is possible to increase the sensitivities of standard capacitive pressure sensors which have no evacuated back volume. The reason for this increased sensitivity is that the DC bias-voltage can be held closer to a pull-in voltage which defines the limit where collapsing of the diaphragm will occur. The present invention provides the additional advantage that manufacturing tolerances are automatically compensated.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electronic circuit for controlling a capacitive pressure sensor, which capacitive pressure sensor has electrodes, including an electrically conductive back plate, arranged to form a plate electrode capacitor with a capacity that varies in dependence on pressure changes exerted on a deflectable diaphragm forming one plate electrode of the capacitor, wherein the electronic circuit comprises:
   a DC voltage source being adapted to generate a DC bias-voltage to be applied across the electrodes of the capacitor,
   an AC voltage source being adapted to generate an AC voltage signal to be applied across the electrodes of the capacitor, the DC bias-voltage and the AC voltage signal being configured and arranged for application across the diaphragm and the back plate, and
   a controller being adapted to receive an output signal of the capacitor and to control the DC voltage source such that the DC bias-voltage applied to the capacitor has a value that maintains the capacity of the capacitor (C) at a desired value.

2. The electronic circuit as claimed in claim 1, wherein a frequency of the AC voltage signal is set to be outside an operational frequency range of the capacitive pressure sensor.

3. The electronic circuit as claimed in claim 2, wherein the frequency of the AC voltage signal is set to be above an intrinsic resonance frequency of the diaphragm of the capacitor.

4. The electronic circuit as claimed in claim 3, wherein the frequency of the AC voltage signal is set to be between five times and twenty times higher than the intrinsic resonance frequency of the diaphragm of the capacitor.

5. The electronic circuit as in claim 2, wherein the operational frequency range of the capacitive pressure sensor has a lower limit at 100 Hz and an upper limit at 20 kHz.

6. The electronic circuit as claimed in claim 1, wherein an amplitude of the AC voltage signal is set so that it does not interfere with the output signal of the capacitive pressure sensor.

7. The electronic circuit as claimed in claim 1, wherein the controller is adapted to change the value of the DC bias-voltage signal with a change rate below a lower limit of an operational frequency range of the capacitive pressure sensor.

8. The electronic circuit as claimed in claim 1, further comprising a band pass filter arranged between the capacitor and the controller.

9. The electronic circuit as claimed in claim 1, further comprising a rectifier arranged between the capacitor and the controller.

10. The electronic circuit as claimed in claim 1, further comprising a low pass filter arranged between the capacitor and the controller.

11. A capacitive pressure sensor system, comprising:
the electronic circuit as claimed in claim 1, and
a capacitive pressure sensor that comprises an electrically conductive diaphragm being deflectable by a varying pressure, wherein the diaphragm and the back plate are spaced from each other and form a first and a second plate electrode of a capacitor.

12. The capacitive pressure sensor system as claimed in claim 11, wherein the diaphragm and a housing encircle a back volume and seal the back volume against the environment.

13. The capacitive pressure sensor system as claimed in claim 12, wherein the back volume is evacuated.

14. The capacitive pressure sensor system as claimed in claim 12, wherein the back plate has a plurality of through holes and the back volume continuously extends to both sides of the back plate.

15. The capacitive pressure sensor system as in claim 11, wherein the capacitive pressure sensor is a capacitive microphone.

* * * * *